Patented Aug. 22, 1950

2,519,796

UNITED STATES PATENT OFFICE 2,519,796

MILLING RUBBERY HYDROCARBON POLYMER WITH RESINOUS RESIDUE FROM POLYMERIZATION OF CRACKED GASOLINE

Lawrence R. Sperberg, Phillips, Tex., and Chester C. Crawford, Bartlesville, Okla., assignors to Phillips Petroleum Company, a corporation of Delaware No Drawing. Application January 5, 1948, Serial No. 647

2 Claims. (Cl. 260—33.6)

This invention relates to rubber substitutes or synthetic elastomers. In one aspect this invention relates to rubber substitutes in which plasticizers or softeners have been incorporated. In another aspect this invention relates to compounding materials for use with rubber substitutes. In a more specific aspect this invention relates to the utilization of polymer products of the polymerization of unrefined cracked gasolines.

In processing rubber substitutes or synthetic elastomers of the types comprising polymers of butadiene, butadiene-styrene, butadiene-acrylonitrile, etc., as described more fully hereinafter, it is necessary to compound or mix the synthetic elastomers, hereinafter referred to as such, or as rubber stocks or rubber materials, with certain ingredients which accentuate certain characteristics for the use of the material is intended. Several such ingredients are, for example, suitable reinforcing pigments as carbon black, fillers such as zinc oxide or magnesium carbonate, various accelerators, sulfur, etc., and are among those which in various combinations impart improvements to properties of the final vulcanizate as aforementioned, said properties being, for example, abrasion, flex-life, hysteresis, resistance to tear, tensile strength, elongation, modulus, etc.

Some raw rubber stocks are tough and non-plastic and must be softened or rendered in a plastic condition to readily absorb the compounding ingredients aforedescribed. Mixing of tough rubber stocks with compounding ingredients is effected by means of mastication or softening, at a controlled temperature in the range of 50–350° F. Mastication involves mechanically kneading the rubber material, either by passing it through an open mill, i. e. passing it between rollers running at different speeds whereby it is subjected to compression followed by a shearing action, or by placing it in an enclosed mixer of the Banbury type where much the same effect is produced. The open mill and the Banbury-type mixer comprise standard equipment used in compounding rubber. Mastication or softening, referred to hereinafter as milling, is time consuming, requires power and can liberate great heat to a damaging extent. Consequent excessive temperatures during the milling of the rubber material are undesirable since they usually lead to a prevulcanization or scorching effect, difficulty of maintaining uniform thickness in calendered or extruded mixtures, and to excessive shrinkage. Various known agents are used to accelerate milling by virtue of their affinity for the rubber material and are referred to hereinafter as rubber plasticizers or softeners. Said plasticizers or softeners when incorporated with rubber materials serve to increase the pliability, durability and tack of the composition as well as to facilitate compounding, both by aiding the dispersion of solids and by lubricating the mixture, whereby less power is consumed in the mixing, and prevulcanization is greatly minimized.

Many of the types of softeners used are vegetable and mineral oils, waxes, asphalts, rosin, and tars. The various softeners function in different capacities but generally are of a solvent, swelling, or lubricating type and are added on the mill, thereby conditioning said rubber material for mixing or compounding as aforedescribed.

The effectiveness of the various softeners differs greatly and the proportions in which they are added vary. The addition of softeners to rubber stocks modifies the properties of the final vulcanizate considerably. In many instances certain qualities of the final product are impaired thereby. For example, in tire tread and carcass stock and in hard rubber products, abrasion losses, especially in synthetic materials, are high and tensile strength is decreased by many softeners. In the processing of rubber materials, large quantities of softener are often required and this is especially true in the processing of synthetic elastomers wherein milling presents added difficulties, i. e. the oxidative breakdown which occurs in the plasticizing of natural rubber does not occur in the processing of high molecular weight synthetic elastomers which are often especially tough and sometimes difficult to mill. The rate of vulcanization is affected by softeners in large quantities, and not only is a satisfactory state of cure difficult to attain but it becomes necessary to increase considerably the amount of the accelerator to effect vulcanization at all.

Additional problems after the compositions have aged also arise. Cracking of the surface and final failure of the article occurs sooner in some compositions than others. The length of time before failure, i. e. flex-life, depends somewhat upon the modification by the softener. Also the softener, particularly the paraffinic type, tends to go to the surface, gives an oily appearance to the rubber, becomes dry and eventually cracks. This property is called "leaching" or "blooming" and is common in many compositions, especially in those where large quantities of softener are necessary.

We have now found novel softeners which by their incorporation with rubber materials such as described above, provide rubber compositions of desired plasticity and tack on the mill which as regards stress-strain properties, aging properties, curing rate and high state of cure, flex-life, and stability, provide for superior rubber products.

An object of this invention is to provide rubber plasticizers or softeners derived from the product of the polymerization of unrefined cracked gasolines.

Another object of this invention is to provide rubber compositions especially suitable for highly loaded stocks wherein the rate of cure must be rapid.

A further object of this invention is to provide novel rubber compositions in which are incorporated as plasticizers or softeners, resinous polymers derived from the product of polymerization of cracked gasolines.

Still a further object of this invention is to provide a method of plasticizing or softening rubber substitutes or synthetic elastomers.

Other objects and advantages of this invention will become apparent, to one skilled in the art, from the accompanying disclosure and discussion.

The novel effective plasticizers of our invention, hereafter referred to as the novel resinous softeners, comprise the normally solid polymer product of polymerization of unrefined cracked gasolines. The polymerization referred to herein is a polymerization treatment of unrefined cracked gasolines, wherein the purpose is to remove materials therefrom, detrimental to the use of said gasolines as a motor fuel. The impurities so removed comprise chiefly diolefins and other gum-forming materials. The mono-olefins are largely retained as such, the polymerization product thereby chiefly comprising diolefin polymers.

Such a polymerization can take place in a mixed, liquid, or vapor phase but is usually carried out in the mixed phase since such conditions reduce the loss of mono-olefins to the polymer product. The polymerization takes place at a temperature in the range of 250–750° F. and at a pressure in the range of 50–600 p. s. i. g., the minimum pressure being dependent upon that required to maintain the mixed phase, and is usually carried out in the presence of a contact mass such as a clay. However, a contact material is not necessary, for the polymerization will occur in the absence of a contact mass, except at a lower rate. The total polymer product of this polymerization occurs as a normally liquid material and is a viscous mixture of polymers, having a solids content in the range of 50–80 weight per cent. The solids are resinous materials and are removed from the total product as a residue of vacuum distillation. The invention herein is concerned with the utilization of the normally solid polymer product or resinous polymer, abovedescribed, as a plasticizer for rubber materials. The term "rubber materials" or "rubber stock" is used herein to denote synthetic elastomers or rubber substitutes of the types comprising polymers of butadiene, butadiene-styrene, and butadiene acrylonitrile, more fully described hereinafter.

The total polymer product of said polymerization comprises chiefly diolefin polymer. The normally liquid constituents of the total product comprise a significant mono-olefin polymer content, whereas the solid resinous materials comprise substantially completely a diolefin polymer, thereby existing in a more highly unsaturated state and consequently having a higher iodine number than that of the total viscous product. Iodine number is an expression of unsaturation and represents the number of grams iodine that will react with 100 grams of the sample. Increased iodine number can be correlated broadly to an increase in plasticizing power of a material, i. e. a plasticizer possessing a low iodine number is a less efficient plasticizer than another having a high iodine number. We have found that the said resinous polymer offers an improvement in iodine number over that of the viscous polymer product, having an iodine number in the range of 200–300 as compared to an iodine number in the range of 100–200 of the viscous polymer. The resinous solid product has a nonvolatiles content of 100 per cent as measured at 225° F. for a duration of 3 hours, a softening point in the range of 140–250° F. as measured according to ASTM Designation E28–42T, and an acidity of essentially nil as measured by ASTM Designation D663–44T.

Specific examples of the softeners employed in the compositions of our invention are as follows:

| | Resinous Solids | | |
|---|---|---|---|
| | #1 | #2 | #3 |
| Softening point °F.[1] | 127 | 147 | 178 |
| Iodine Number [2] | 230 | 220 | 220 |

[1] ASTM Designation E28–42T.
[2] WIJS Method—grams iodine/100 grams sample.

The time required for incorporation of the plasticizer with the rubber material is significant because of the damaging effect resulting from heat build-up and consequent temperature increase introduced during a prolonged milling period, i. e. prevulcanizing or scorching as above described.

For milling, the solid resins are especially preferred, as the rate of incorporation is higher and mixing is easier than when using the viscous polymer product. In compositions in accordance with the following formula,

| | Parts by weight |
|---|---|
| Butadiene-styrene copolymer | 100 |
| Carbon black (furnace type) | 50 |
| Zinc oxide | 3 |
| Sulfur | 1.75 |
| Accelerator [1] | 0.8 |
| Resinous polymer softener | 4–10 |

[1] Condensation product of mercaptobenzothiazole and cyclohexylamine.

these softeners were found to possess powerful plasticizing action. The rubber material on the mill exhibited excellent processing characteristics. Short softener addition times were observed, the novel resinous softeners requiring an addition time of 1 to 2¾ minutes, as compared to addition times of 1½ to 8½ minutes required by the viscous total polymer. The mixing properties and powerful plasticizing effect of the novel softener are further made evident in the prevulcanizates of our compositions in that there is little heat build-up and consequent undesirable prevulcanization during milling or other processes carried out prior to the vulcanization proper.

The synthetic elastomers, may be prepared by either emulsion polymerization or homogeneous polymerization (sometimes called mass polymerization). The elastomers are prepared by polymerization of conjugated diolefins such as butadiene, isoprene, piperylene and the like either alone or in admixture with each other or with other polymerizable organic compounds such as styrene, vinylpyridine, acrylonitrile and the like. In the emulsion type polymerization, various modifiers, initiators, emulsifying agents, etc. may be employed. In the homogeneous type polymerization, catalysts such as alkali metals and the like may be employed. The following is a conventional recipe for the emulsion type preparation of a butadiene-styrene copolymer and is that employed in the preparation of the rubber stocks referred to in the examples herein:

|  | Parts by weight |
|---|---|
| Butadiene | 75 |
| Styrene | 25 |
| Potassium persulfate | 0.30 |
| Tert. C$_{12}$ mercaptan | 0.28 |
| Soap | 5.0 |
| Water | 180 |

The ingredients are emulsified and polymerization is allowed to proceed for 8 hours at 122° F. with constant agitation. The resulting latex is inhibited with 2.5 parts of phenyl beta naphthylamine and then coagulated with aluminum sulfate solution. The polymer is recovered and dried until substantially free of water.

The rubber compositions of our invention comprise the rubber materials aforedescribed in which are incorporated suitable reinforcing pigments such as carbon black, zinc oxide, magnesium carbonate, etc., and other fillers, sulfur, accelerators, and the novel resinous softener. The novel resinous softeners of our invention when incorporated with a synthetic elastomer comprise as high as 50 per cent by weight of the resulting plasticized elastomer and preferably in the range of 3–20 per cent by weight of our compositions. Stocks from our compositions are particularly useful for footwear, extruded articles, tire carcasses, sponge rubber, and other mechanical goods and may also be used for tire treads.

The compositions of our invention possess improved stress-strain properties. Elongations at break are high under test conditions measured at 80° F., 200° F., and after oven aging 24 hours at 212° F. Tensile strengths are also high. Elongations at break at room temperature (including oven aged) range from 350–750 per cent depending upon the quantity of softener added, and at 200° F. values range from 300–590 per cent. Corresponding tensile strengths at these two conditions are in the range of 2500–3000 and from 1100–1310 p. s. i., respectively. High ultimate tensile strength and retention of tensile strength and elongation after aging are equally important, especially in tire carcass stocks, since the dynamic fatigue effect, which usually results after constant stress, affects the stress and life of the tire considerably. Our compositions possess superior aging properties and with suitable compounding may be employed to an advantage in tire carcass stocks. Advantages of this invention are illustrated by the following examples. The reactants, and their proportions, and other specific ingredients of the recipes, are presented as being typical and should not be construed to limit the invention unduly.

Example I is a tabulation of stress-strain properties of a butadiene-styrene copolymer composition with which varied amounts of the novel softener have been incorporated and includes for comparison, similar data pertaining to 5 commercial softeners. Although the invention is described in terms of a butadiene-styrene copolymer prepared in the above manner, it is to be understood that the novel softeners described herein, plasticize other synthetic elastomers, such as those aforedescribed.

EXAMPLE I

Rubber compositions were prepared employing the following formula:

|  | Parts by weight |
|---|---|
| Butadiene-styrene copolymer | 100 |
| Furnace-type carbon black | 17 |
| Channel black | 35 |
| Zinc oxide | 5 |
| Sulfur | 1.75 |
| Accelerator [1] | 1.07 |
| Softener | (Varied) |

[1] Condensation product of mercaptobenzothiazole and cyclohexyl amine.

The butadiene-styrene copolymer was prepared as aforedescribed. The novel softener had a softening point of 147° F. and an iodine number of 220 and is that designated hereinbefore as Resinous Solid No. 2. The amount of novel softener was varied at 2, 4, 6, 8, and 16 parts per 100 parts of butadiene-styrene copolymer. These compositions are compared with those containing well-known commercial softeners.

The commercial softeners used herein are designated as Softeners A, B, C, D, and E, and are identified as follows:

Softener A, Asphalt #6, Standard Oil Company; Softener B, Paraflux, C. P. Hall; Softener C, Cumar RS, Barrett Division, Allied Chemical and Dye Corp.; Softener D, Dutrex, Shell Oil Co.; and Softener E, Naftolen R-100, Wilmington Chemical Corp.

The following stress-strain properties (75 minutes' cure) were measured at the temperatures indicated.

| Softener | PHR [1] | Unaged | | | | | Oven aged 24 hrs. @ 212° F. | |
|---|---|---|---|---|---|---|---|---|
| | | 80° F. | | | 200° F. | | 80° F. | |
| | | Stress, p. s. i. 300% Mod. | Tensile, p. s. i. | Per Cent Elongation at break | Tensile, p. s. i. | Per Cent Elongation at break | Tensile, p. s. i. | Per Cent Elongation at break |
| Resinous Solid No. 2 | 2.0 | 1,650 | 2,900 | 478 | 1,170 | 293 | 2,720 | 305 |
| Do | 4.0 | 1,360 | 2,955 | 550 | 1,210 | 360 | 2,770 | 353 |
| Do | 6.0 | 1,200 | 2,900 | 595 | 1,290 | 403 | 2,960 | 420 |
| Do | 8.0 | 1,070 | 2,680 | 603 | 1,310 | 435 | 2,490 | 405 |
| Do | 16.0 | 595 | 2,220 | 750 | 1,100 | 590 | 2,380 | 568 |
| Softener A | 8.0 | 1,250 | 2,475 | 508 | 1,100 | 363 | 2,380 | 323 |
| Softener B | 8.0 | 1,210 | 2,520 | 525 | 1,130 | 345 | 2,220 | 323 |
| Softener C | 8.0 | 1,320 | 2,700 | 518 | 1,250 | 360 | 2,740 | 340 |
| Softener D | 8.0 | 1,215 | 2,580 | 513 | 1,150 | 365 | 2,240 | 308 |
| Softener E | 8.0 | 1,410 | 2,690 | 500 | 920 | 273 | 2,260 | 313 |

[1] Parts per hundred parts rubber hydrocarbon.

The resins incorporated very readily into the rubber. The times for incorporation of the novel resinous softener were 1 minute for the 2, 4, 6 PHR loadings, 1½ minutes for the 8 PHR loadings, and 2¾ minutes for the 16 PHR loadings. The above addition times are comparable to addition times of 1½, 2½, 4, 6, and 8½ minutes respectively, required for incorporation of the viscous polymer in a similar composition.

With no degeneration of tensile or elongation, low-modulus stocks are characteristic of these compositions, and such a property is necessary in sponge or blown rubber. The product must "give" readily but must not be under cured. Under-cured stocks in time tend to become stiff and boardy. However, when stiff stocks are required such as for shoes, soles and heels, certain mechanical goods and other hard rubber products, and where products highly vulcanized and of high tensile strength are still desirable, suitable compounding with high loadings of fillers impart the desired moduli. The resinous softeners of our invention exert a non-retarding effect, or even an accelerating effect on the rate of cure and thereby present no difficulties in the vulcanization of highly loaded stocks. The rapid rate of cure which is characteristic in these compositions is unusual especially in highly loaded stocks. Compression set tests indicate the rate of cure to be fast and to reach a high state of cure rapidly. Compression set data are shown in Example II.

EXAMPLE II

Compression set data obtained using the compositions of Example I are shown as follows:

*Compression set tests[1]*

| Softener | PHR[2] | Minutes Cure @ 280° F. | | | |
|---|---|---|---|---|---|
| | | 30 | 45 | 75 | 150 |
| | | Per cent | Per cent | Per cent | Per cent |
| Resinous Solid No. 2 | 2.0 | 67.4 | 40.8 | 19.3 | 9.4 |
| Do | 4.0 | 63.0 | 37.1 | 20.6 | 10.3 |
| Do | 6.0 | 60.8 | 36.2 | 20.5 | 8.4 |
| Do | 8.0 | 60.3 | 36.2 | 20.5 | 10.9 |
| Do | 16.0 | 60.2 | 40.1 | 24.6 | 11.9 |
| Softener A | 8.0 | 87.6 | 54.7 | 28.7 | 12.1 |
| Softener B | 8.0 | 85.4 | 47.4 | 25.8 | 11.0 |
| Softener C | 8.0 | 82.3 | 49.4 | 25.4 | 10.5 |
| Softener D | 8.0 | 83.6 | 51.5 | 26.1 | 10.7 |
| Softener E | 8.0 | 73.7 | 46.2 | 21.8 | 8.4 |

[1] Softeners A, B, C, D, and E are further identified hereinbefore.
[2] Parts per hundred parts rubber hydrocarbon.

Another important feature of the present compositions is the stability of the constituents of the compounded material, i. e. the non-blooming properties. Even at high loadings the softeners and the sulfur remain incorporated as integral parts of the composition. High flex-life is also characteristic for it may be seen that with this and the aforementioned properties, the rubber products will serve for long periods of time without surface cracking. These properties are of particular value in stocks for hose, belting, tubing, boots, and overshoes.

EXAMPLE III

Flex-life data obtained using the compositions of Example I are shown as follows:

*Flex-life at 210° F. (75 minute cure)[1]*

[Thousands of flexures to failure.]

| Softener | PHR[2] | Original | Oven Aged 24 hrs. @ 212° F. |
|---|---|---|---|
| Resinous Solid No. 2 | 2.0 | 7.7 | 4.7 |
| Do | 4.0 | 10.5 | 6.3 |
| Do | 6.0 | 13.3 | 6.3 |
| Do | 8.0 | 17.4 | 7.2 |
| Do | 16.0 | 22.5 | 9.1 |
| Softener A | 8.0 | 10.5 | 2.6 |
| Softener B | 8.0 | 11.8 | 2.5 |
| Softener C | 8.0 | 9.3 | 4.7 |
| Softener D | 8.0 | 14.1 | 2.2 |
| Softener E | 8.0 | 7.0 | 2.5 |

[1] Softeners A, B, C, D, and E are further identified hereinbefore.
[2] Parts per hundred parts rubber hydrocarbon.

No softener blooming or sulfur blooming was observed in the samples.

EXAMPLE IV

Below are listed stress-strain properties, compression set data, and flex-life data of the composition shown and the three novel resinous plasticizers described heretofore. A commercial asphalt softener is included for reference.

A butadiene-styrene copolymer composition was prepared as follows:

| | Parts by weight |
|---|---|
| Butadiene-styrene copolymer | 100 |
| Carbon black (furnace type) | 50 |
| Zinc oxide | 3 |
| Sulfur | 1.75 |
| Accelerator[1] | 0.8 |
| Softener | 10 |

[1] Condensation product of mercaptobenzothiazole and cyclohexylamine.

The rubber stock formula was the same as that of Example I. The novel softeners employed were the resinous solids aforedescribed and designated heretofore as Resinous Solids No. 1, No. 2, and No. 3. A commercial asphalt softener was tested as a control. The stress-strain properties were measured at the temperatures indicated as follows:

| Softener | Stress-Strain Properties, Unaged (75 Minute Cure) | | | | | Oven aged, 24 hrs. @ 212° F. (150 Minute Cure) 80° F. | |
|---|---|---|---|---|---|---|---|
| | 80° F. | | | 200° F. | | | |
| | Stress p. s. i. 300% Modulus | Tensile, p. s. i. | Percent Elongation at break | Tensile, p. s. i. | Percent Elongation at break | Tensile, p. s. i. | Percent Elongation at break |
| Resin No. 1 | 1,190 | 2,350 | 595 | 1,300 | 340 | 2,400 | 485 |
| Resin No. 2 | 1,120 | 2,330 | 610 | 1,130 | 320 | 2,410 | 510 |
| Resin No. 3 | 1,230 | 2,450 | 590 | 1,250 | 340 | 2,410 | 470 |
| Asphalt | 1,500 | 2,260 | 430 | 1,005 | 240 | 2,140 | 340 |

The flex-life properties were determined at 210° F. and are listed as follows:

|  | Flex-life (Thousands of flexures to failure) | |
|---|---|---|
|  | Unaged | Oven Aged 24 hrs. @ 212° F. |
| Resin No. 1 | 11.4 | 3.3 |
| Resin No. 2 | 18.8 | 5.2 |
| Resin No. 3 | 27.3 | 4.5 |
| Asphalt | 19.9 | 1.5 |

The above samples were cured for 75 minutes at 280° F.

Compression set properties were as follows:

|  | Compression Set, Minutes Cure at 280° F. | | | |
|---|---|---|---|---|
|  | 30 | 45 | 75 | 150 |
|  | Per cent | Per cent | Per cent | Per cent |
| Resin No. 1 | 57.0 | 35.3 | 18.1 | 7.6 |
| Resin No. 2 | 58.0 | 34.9 | 19.0 | 8.7 |
| Resin No. 3 | 57.4 | 35.9 | 20.7 | 8.1 |
| Asphalt | 75.3 | 50.6 | 23.8 | 9.6 |

As will be evident to those skilled in the art, various modifications of this invention can be made, or followed, in the light of the foregoing disclosure and discussion, without departing from the spirit or scope of the disclosure or from the scope of the claims.

We claim:

1. An improved method for compounding a solid rubbery hydrocarbon polymer of a conjugated diene, comprising milling such a hydrocarbon polymer at a temperature within the range of 50 to 350° F. and during said milling adding to said hydrocarbon polymer a solid resinous product separated as a distillation residue from a liquid polymeric material produced by a mixed phase polymerization of unrefined cracked gasoline at a temperature in the range of 250 to 750° F., at a pressure in the range of 50 to 600 p. s. i. g., and in the presence of a contact mass comprising a clay; said resinous product comprising from 3 to 20 per cent by weight of a resulting solid resinous product-hydrocarbon polymer, and consisting of 100 per cent non-volatile matter as measured for a duration of 3 hours at a temperature of 225° F. at atmospheric pressure, and having an iodine number in the range of 200 to 300, a softening point within the limits of 140 to 250° F., and an acidity of essentially nil; and recovering a resulting plasticized rubbery hydrocarbon polymer as a product of the process.

2. An improved process for compounding a rubbery copolymer of 1,3-butadiene and styrene, comprising milling said copolymer at a temperature within the limits of from 50 to 350° F. and during said milling adding a solid resinous material to said copolymer in a proportion to comprise from 3 to 20 per cent by weight of a resulting resinous material-copolymer product, said resinous material having been separated as a distillation residue from a liquid polymeric material produced by polymerization of unrefined cracked gasoline at a temperature in the range of 250 to 750° F., at a pressure in the range of 50 to 600 p. s. i. g. and in the presence of a contact mass comprising a clay, and consisting of 100 per cent non-volatile matter as measured for a duration of 3 hours at a temperature of 225° F. at atmospheric pressure, and having an iodine number in the range of 200 to 300, a softening point within the limits of 140 to 250° F., and an acidity of essentially nil; and recovering a plasticized copolymer rubber as a product of the process.

LAWRENCE R. SPERBERG.
CHESTER C. CRAWFORD.

REFERENCES CITED

The following references are of record in the file of this patent:

UNITED STATES PATENTS

| Number | Name | Date |
|---|---|---|
| 1,919,722 | Hyman | July 25, 1933 |
| 1,919,723 | Hyman | July 25, 1933 |
| 1,989,246 | Reed | Jan. 29, 1935 |
| 2,008,102 | Hyman | July 16, 1935 |
| 2,137,492 | Hyman | Nov. 22, 1938 |
| 2,427,532 | Miskel | Sept. 16, 1947 |

OTHER REFERENCES

Ludwig et al: India Rubber World, vol. III, Oct. 1944, pp. 55 to 62.

Bacon et al.: Proc. of Rubber Technology Conference, London, 1938, pp. 525 to 527.